United States Patent [19]

Faverty et al.

[11] 4,335,965

[45] Jun. 22, 1982

[54] FIBER-RESIN BLENDING TECHNIQUE

[75] Inventors: Delmar A. Faverty, Alliance; Robert E. Shuck, North Canton, both of Ohio

[73] Assignee: Dresser Industries, Inc., Dallas, Tex.

[21] Appl. No.: 217,286

[22] Filed: Dec. 16, 1980

Related U.S. Application Data

[62] Division of Ser. No. 922,608, Jul. 7, 1978, Pat. No. 4,260,265.

[51] Int. Cl.³ .................. B01F 13/02; B01F 15/02
[52] U.S. Cl. .................. 366/150; 118/303; 118/309; 366/101; 366/176; 366/191; 427/180
[58] Field of Search ............. 366/101, 106, 107, 150, 366/131, 154, 176, 191; 118/303, 36, 309; 427/180, 185; 264/349; 239/427.5

[56] References Cited

U.S. PATENT DOCUMENTS

| | | | |
|---|---|---|---|
| 3,003,751 | 10/1961 | Trost | 118/303 |
| 3,012,900 | 12/1961 | Kleinmann | 118/36 |
| 3,819,157 | 6/1974 | Markfelt | 366/101 |
| 4,050,677 | 9/1977 | Benthin | 366/101 |

*Primary Examiner*—Robert W. Jenkins

[57] ABSTRACT

An apparatus and method for the production of molding compositions for fiber-reinforced resin composites in which chopped fiber tow is fluidized, expanded and admixed with dry powdered resin is disclosed. Fluidized fibers are conveyed through a flow accelerating device and discharged into an enlarged mixing chamber wherein turbulent admixing with powdered resin injected therein occurs.

5 Claims, 5 Drawing Figures

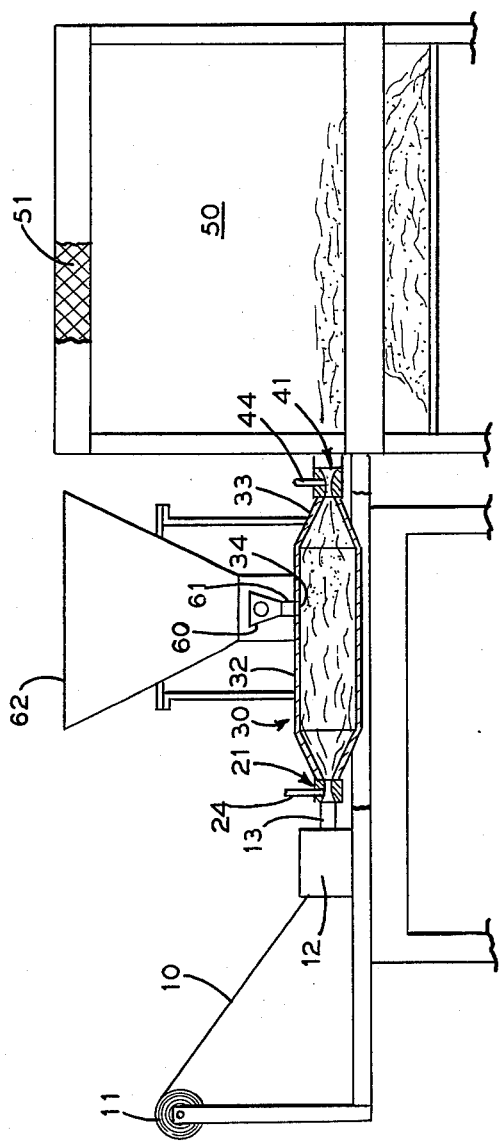
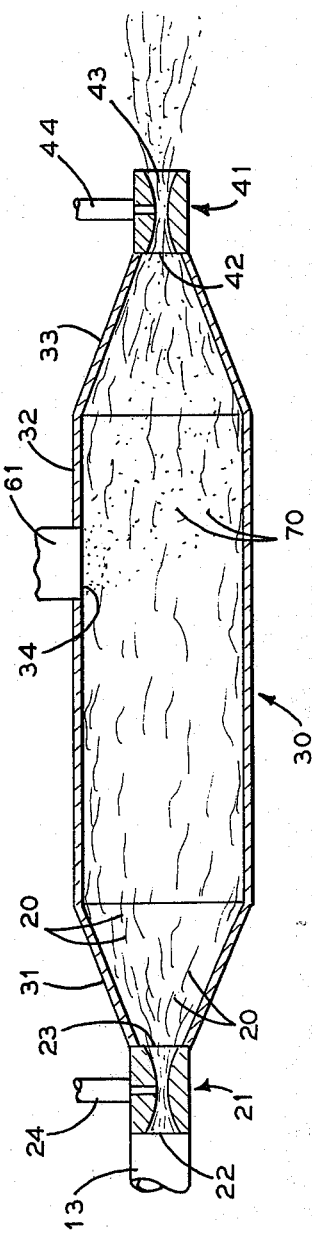

FIBER-RESIN BLENDING TECHNIQUE

This is a division, of application Ser. No. 922,608 filed July 7, 1978, now U. S. Pat. No. 4,260,265.

BACKGROUND OF THE INVENTION

The invention relates to an apparatus and method of forming fibrous molding compositions for fiber-reinforced resin composites and, more particularly, to an apparatus and method for impregnating or admixing discontinuous fibers with dry powdered resin.

Fiber-reinforced resin composites are assemblies of fibers geometrically arranged within a resin matrix to obtain specific characteristics and properties. The overall properties of the composite are a function of many variables including the amount and type of fiber and matrix, the orientation and distribution of the fiber, the compositing technique, and the processing method utilized in fabricating the finished composite article.

In processes utilized to form composite articles having considerable and varying thickness and contours, it is desirable to utilize resin moldings containing discontinuous fibers to obviate a need for subsequent machining.

In the past, fibrous tow or roving has been passed through a liquid resin composition, dryed and chopped to provide a mass of loose resin-coated fiber segments. Wet resin impregnation of the fibers, however, requires the availability of a suitable solvent for the matrix material. Moreover, it has been found that some of the fiber segments impregnated by the wet resin invariably cohere requiring additional separation to optimize strength in the finished article. Wet impregnation also often requires the maintenance of resin bath levels or heating to maintain proper viscosity of the bath or both, and subsequent drying.

Dry impregnation or the mixing of discontinuous fibers with dry resin powders is likewise subject to difficulties. Powdered resins and fibers may be mixed in a tumbler or blender. However, in such apparatus the fibers tend to remain in discrete bundles resisting powdered resin penetration, and resulting in a non-homogenous mixture. Molding compositions prepared by such mixing techniques are necessarily produced by batching operations rather than by continuous production techniques.

Application of dry resin to continous fiber tows generally requires in-situ heating to assure coherence between the fiber and resin. Heating, however, may not be desirable or practical. Such techniques may not result in a uniform fiber-resin distribution.

Furthermore, preliminary process conditioning such as solvenating and heating may either limit the materials which can be utilized, or adversely affect the desired properties of the ultimate composite application.

SUMMARY OF THE INVENTION

The invention is directed to a new method and apparatus arrangement for impregnating discontinuous fibers with dry powdered resin without the need for insitu process conditioning.

In a preferred embodiment of the invention, the discontinuous fibers of a chopped tow are fluidized and pneumatically conveyed through a flow accelerating device. The accelerated fluidized fibers are conveyed into and dispersed within an enlarged mixing chamber. A resin filled hopper disposed in communication with the mixing chamber injects a metered rate of resin into the chamber causing the fluidized fibers to admix with the powdered resin. A second flow accelerating device withdraws fluidized amounts of the fibers, now impregnated with powdered resin, preferably at a flow rate greater than that at which the fibers are conveyed into the chamber resulting in increased turbulence and a slightly negative pressure at the outlet of the chamber. The second flow accelerating device converges and accelerates the impregnated fibers and discharges the mixture into a separating tank from which the fluidized gas medium is vented and the fibe impregnated resin is collected.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive manner in which there is illustrated and described preferred embodiments of the invention.

BRIEF DESCRIPTION OF THE DRAWINGS

In the accompanying drawings, forming a part of this specification, and in which reference numerals shown in the drawings designate like or corresponding parts throughout the same;

FIG. 1 is a front elevation view, schematically illustrated, showing an arrangement for forming a fibrous molding composition in accordance with the invention;

FIG. 1A is an enlarged view of part of FIG. 1;

DESCRIPTION OF THE PREFERRED EMBODIMENTS

Figure 2:
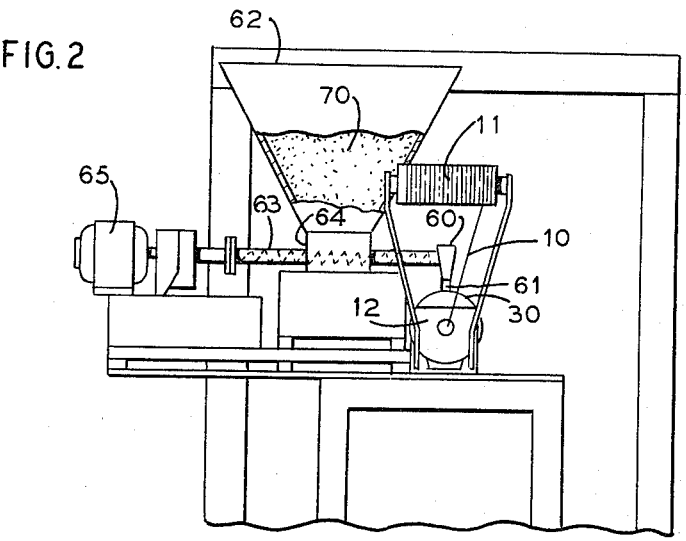
FIG. 2 is a side elevation of the arrangement illustrated in FIG. 1.

FIGS. 1, 1A and 2 illustrate a preferred form of an apparatus arrangement for practicing the invention. In general, a continuous fiber tow 10, wound on a spool 11, extends from the spool 11 onto an adjustable chopping device 12.

The chopping device 12 includes known means for drawing the tow 10 from the spool 11 and means for chopping the tow 10 into discontinuous segments. Chopped fibers 20 are withdrawn from the chopping device 12, via an outlet conduit 13, by a first flow accelerating device 21, such as an ejector or venturi. The flow accelerating device 21 has a suction inlet 22 connected to the outlet conduit 13, a discharge outlet 23 and a pressure inlet 24. The pressure inlet 24 is connected to a pressure source of gaseous motive fluid (not shown), typically compressed air. The discharge outlet 23 is disposed in close fluid communication with a mixing chamber 30.

The mixing chamber 30 is provided with a generally tapered diffuser inlet 31 attached to an enlarged shell 32 and followed by a generally tapered converging outlet 33. The wall of the shell 32 is penetrated by an opening 34. The extremity of the converging outlet 33 is juxtaposed in fluid communication with a suction inlet 42 of a second flow accelerating device 41 having a discharge outlet 43, and a pressure inlet 44 connected to a motive fluid pressure source (not shown). The discharge outlet 43 of flow accelerating device 41 leads to a separating tank 50 which includes filter venting means 51.

A receptacle, preferably a hopper 60 is shown disposed superjacent to the mixing chamber 30. An outlet 61, connects the hopper 60 to the opening 34 in the wall of the shell 32 of the mixing chamber. The hopper 60 is preferably connected to a larger storage hopper 62 via a screw conveyor 63. The screw conveyor 63 is driven by well known means such as a drive motor 65. An agitating device 64, such as a vibratory motor, is connected to the storage hopper 62 for assuring the uninterrupted flow of powdered resin 70 which is stored in the storage hopper 62.

In operation, continuous fiber tow 10, is drawn from the spool 11 into the chopping device 12 and chopped into discontinuous chopped fiber 20. The chopped fiber 20 is withdrawn from the chopping device 12 by the suction generated in the first flow accelerating device 21 due to the motive power of a high pressure stream of fluid directed through the pressure inlet 24. In the preferred embodiment the motive fluid is a gas, in particular, air. The motive fluid entrains and fluidizes the chopped fiber and discharges a fluidized stream of chopped fiber into the mixing chamber 30. As the fluidized fiber is conveyed through the diffuser inlet 31, its velocity is reduced, and fibers are randomly expanded and thoroughly dispersed within the turbulent fluid stream.

Powdered resin 70, previously loaded into the storage hopper 62, is concurrently fed into the screw conveyor 63 which conveys it to the hopper 60. Powdered resin 70 is metered from the hopper 60 into the mixing chamber 30 and intimately mixed with the dispersed fiber.

A continuous stream of resin impregnated fiber is drawn out of the chamber via the converging outlet 33 by the second flow accelerating device 41. In the preferred embodiment, the first and second flow accelerating devices 21, 41 are selected, arranged and operated such that a slight vacuum is maintained about the perimeter of the mixing chamber 30. As the pneumatically conveyed impregnated fiber is removed from the mixing chamber 30, it is further accelerated by the second flow accelerating device 41, and then discharged into the separating tank 50. The separating tank is sized so as to dissipate the velocity of the mixture allowing the resin impregnated fiber to settle in the tank. The conveying fluid vents through the filter venting means 51. The composition of fiber reinforced resin is removed from the separating tank 50 for further processing, such as staging and molding.

It has been found that operation as described effectively explodes a mass of chopped fiber 20 as it is discharged from the first accelerating device 21 into the mixing chamber 30 exposing the surfaces of the individual fibers to the powdered resin 70 which falls into the mixing chamber. Within the shell 32 recirculation and spiraling causes further admixing and adherence, of the fiber and resin.

In the preferred embodiment, the agitating device 64 is utilized to agitate the powdered resin 70 within the storage hopper 62 so as to preclude caking or lumping, break up material bridges and assist flow of the resin from the storage hopper 62.

Figure 3:
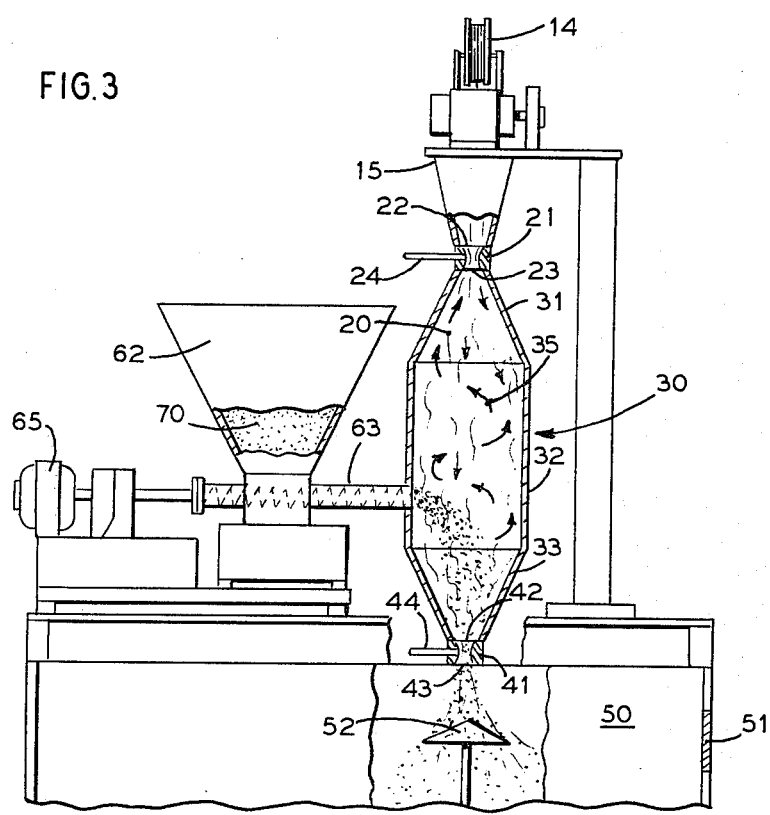
FIG. 3 is a front elevation view, schematically illustrated, showing an alternative embodiment of an arrangement for forming a fibrous molding composition in accordance with the invention, and schematically illustrating a flow pattern within a part of the arrangement.
Figure 4:
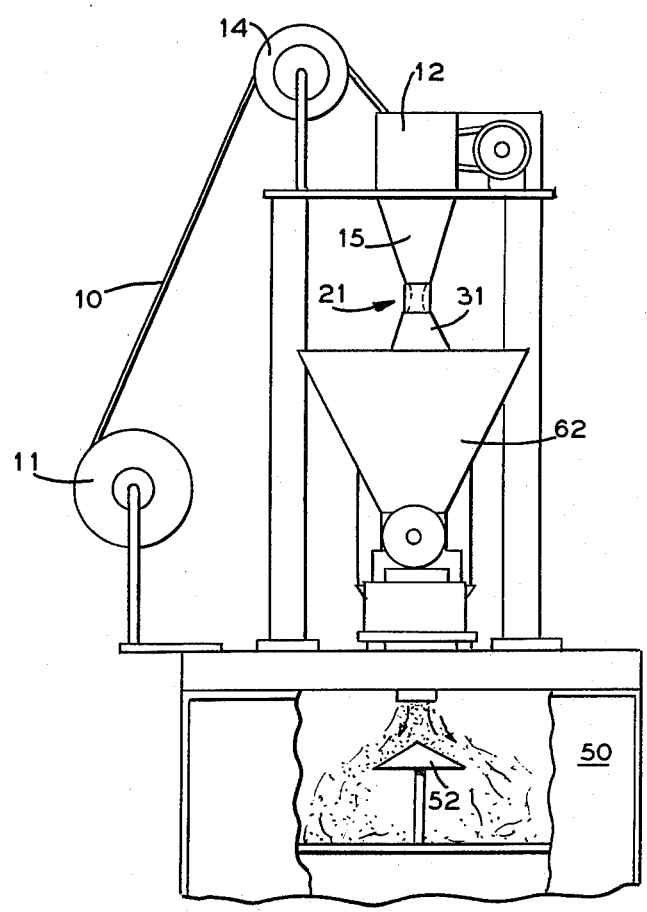
FIG. 4 is a side elevation of the arrangement illustrated in FIG. 3.

An alternative preferred embodiment of an apparatus arrangement for making a fibrous molding composition is illustrated in FIGS. 3 and 4. In FIG. 3, powdered resin 70 stored in a storage hopper 62 is directly conveyed into the mixing chamber 30 by a screw conveyor 63. As shown in FIG. 4, fibrous tow 10 is drawn from a spool 11, over an idler roller 14 and into a chopping device 12. The fiber tow 10 is chopped into discontinuous segments 20 within the chopping device 12 and discharged into a tapered conduit 15 situated below the chopping device.

The tapered conduit 15 is disposed in fluid communication with the suction inlet 22 of a first flow accelerating device 21. Motive fluid (not shown) entrains chopped fiber 20 and discharges it into a mixing chamber 30 which, as shown in FIGS. 3 and 4, is vertically oriented. The second flow accelerating device 41 withdraws resin impregnated fiber from the converging outlet of the mixing chamber 30 and discharges it into a separating tank 50.

FIGS. 3 and 4 schematically illustrate turbulent flow currents 35 generated in a mixing chamber 30 within an arrangement of the type shown.

It is preferred that the half-angle of diffuser inlet 31 be sized relative to the discharge flow configuration of the first flow accelerating device such that a low pressure area is created outside of the discharge cone. Thus, if the discharge cone from the accelerating device, for example, has a half-angle of approximately 7 degrees, a diffuser inlet taper having a half-angle of 30 degrees will produce a spiral flow pattern similar to that illustrated. The flow pattern is such that the fibers, discharged from the flow accelerating device, spread apart within the chamber and a counterflow spiral recirculation of part of the mixture is initiated. The fluidized mixture is withdrawn by a second flow accelerating device 41. Ejection through the second air flow amplifier further expands the fiber-resin mixture which discharges into a separating tank 50. A conical distribution baffle 52 may be arranged within the separating tank to evenly distribute the resin impregnated fibers.

It has been found that the vertical orientation of the mixing chamber results in more efficient mixing relative to a horizontal orientation which may result in powdered resin sticking to the side of the chamber.

The invention is further illustrated by, but not limited to, the following example:

EXAMPLE

A continuous tow of graphite fiber, marketed under the designation PANEX 30C by the Stackpole Fibers Company, a subsidiary of Stackpole Carbon Company, Lowell, Mass. was used in this example. The tow consisted of 160,000 individual filaments, with each filament having a diameter of 7 to 9 microns. A powdered polyphenylene sulfide (PPS) resin marketed by the Phillips Petroleum Company, Bartlesville, Okla. as RYTON V-1 resin was used. The powdered resin had an average particle size of 5 microns. PPS resin has a high melting point (550° F.) and no known solvents below 400° F.

The graphite tow was mechanically drawn from a spool at a rate approximately 54 feet per minute by a Finn and Fram Model 80 chopper and chopped into 1-inch lengths. The chopped fiber tow was pneumatically withdrawn from the chopper by a first TRANS-VECTOR AIR flow amplifier (produced by the Vortec Corporation, Cincinnati, Ohio), pneumatically fluidized, and physically expanded as it was pneumatically conveyed into a mixing chamber. Based on manufacture literature it is believed that the fluidized fiber is accelerated to approximately 1100 feet per second in the Transvector device. The powdered PPS resin was metered directly into the mixing chamber from a superjacent hopper via a Vibrascrew Model SCR-20 powder feeder. The chopped fiber was separated and blown apart, and continuously mixed with the powdered resin in the mixing chamber by the vortex currents formed with the turbulent air flow. The mixture was drawn from the bottom of the chamber by a second transvector air flow amplifier.

The molding compound mixture was further accelerated by the second flow accelerating device and then discharged into a separating tank having a large filter. The flow decelerated allowing the resin impregnating fibers to settle to the bottom of the tank while the conveying air medium vented through the filter. The feed rates of the fiber and resin were regulated to produce a molding compound having a fiber content of 36.64 weight percent of the fiber and resin mixture.

Graphite and fiberglass fibers have actually been used in producing molding compounds in accordance with the disclosures herein. Number and diameter of the fiber in a tow are not critical. Tows ranging from 3,000 to 160,000 filaments have been used with equal success. The powdered resin should be fine enough to surround and adhere to individual filaments. It is found that high relative humidity in the range of 85 to 100 percent causes the fibers to cling together and resist separation. Blends of different powdered resins have been utilized with satisfactory results.

The techniques described herein have been found to shorten material preparation time and improve the quality and consistency of the coating in comparison to tumbling or blending methods of dry impregnation. The improved coating and uniformity of the molding compound results in the ability to produce a comparatively higher strength molded produce having fewer internal defects. The method disclosed herein may be operated as either a continuous or batching process.

Fibrous molding compositions formed by the inventive method display a uniform fiber and resin distribution. Coherence between the resin and the fiber molding compound is retained for long periods without further processing. It will be noted that the dry powdered resins utilized herein are not in a tacky or sticky state.

The percentage of fibers relative to the resin may be varied to optimize strength, impact resistance, surface finish and other properties needed for specific composite applications.

As used in the specification and claims the term "fluidized" will be understood to connote the movement of particulate manner, either fiber or resin or both as modified in the context of the term's usage, conveyed or transported by a gaseous medium. Transport of particulate matter in a liquid phase is outside the scope of the present invention. The term "fluid communication" will be understood to denote means for passage of fluid or fluidized matter between components.

It will be evident to those skilled in the art that various alterations and changes may be made to the exemplary apparatus arrangement without departing from the spirit of the invention covered in the claims. For example, the mixing chamber's shell may be cylindrical in which case the diffuser inlet and converging outlet of the chamber will be generally conical or funnel shaped. The shell could alternatively have rectangular or square sides, in which case the diffuser inlet and converging outlet might be tapered rectangular or square members. Although the specific types of flow accelerating devices are described herein, other fluidizing means capable of performing the functions described and claimed herein may be used.

The embodiments of the invention in which an exclusive property or privilege is claimed are defined as follows:

1. An apparatus for impregnating fluidized fibers with powdered resin comprising: a first flow accelerating device through which the fluidized fibers are conveyed, a mixing chamber mounted in fluid communication with said first flow accelerating device, means for decelerating and dispersing the fluidized fibers into said mixing chamber from the first flow accelerating device, a receptacle containing a supply of the powdered resin in communication with said mixing chamber, means for injecting a metered flow rate of said powdered resin into the mixing chamber, and a second flow accelerating device in fluid communication with said mixing chamber for withdrawing resin impregnated fibers from the mixing chamber.

2. In the formation of fibrous molding compositions for fiber-reinforcing resin composites, an apparatus arrangement for the impregnation of discontinuous fibers with a dry powdered resin having a mixing chamber in which fibers and resin are admixed, and hopper means attached to the chamber for feeding the powdered resin into the chamber, the combination comprising: means for fluidizing the fiber including a first flow accelerating device connected to and discharging fluidized fibers into the mixing chamber, means for decelerating and dispersing the fluidized fibers within the chamber, and a second flow accelerating device connected to the chamber for withdrawing fluidized fibers and resin.

3. The combination as set forth in claim 2 wherein the means for decelerating and dispersing the fluidized fibers within the chamber includes a generally tapered diffuser inlet to the chamber disposed to receive discharge flow from the first flow accelerating device.

4. The combination as set forth in claim 3 wherein the chamber is generally cylindrical and diffuser is generally conical.

5. The combination as set forth in claim 4 wherein the chamber further includes a generally conical outlet juxtaposed in fluid communication with the second flow accelerating device.

* * * * *